J. B. HERMAN.
Wheel-Cultivator.
No. 59,012. Patented Oct. 23, 1866.
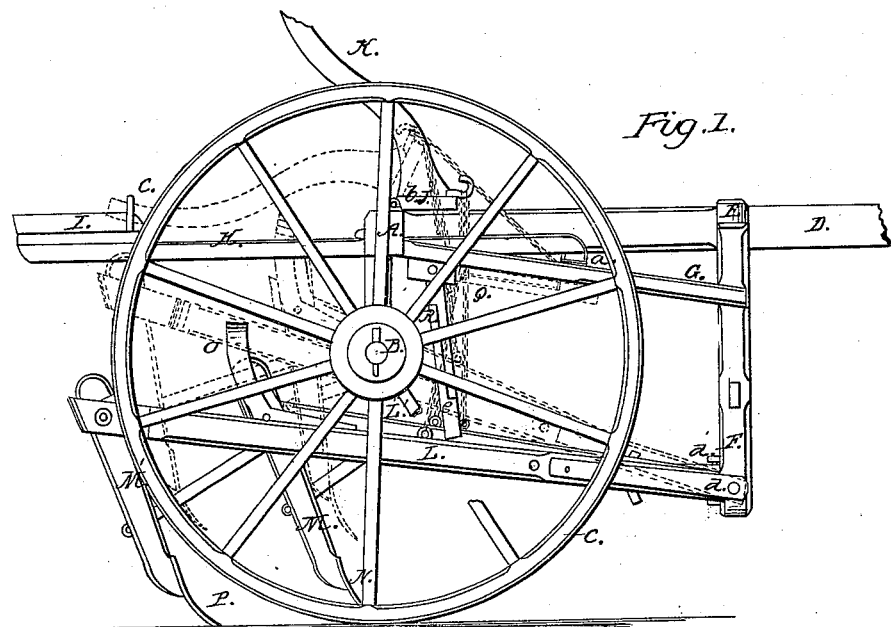
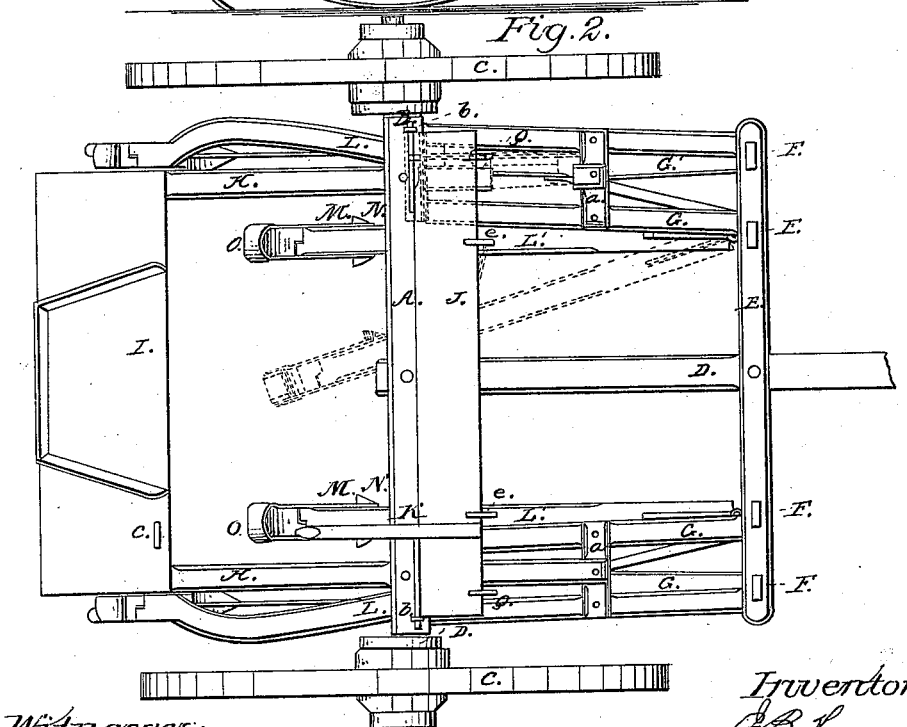

UNITED STATES PATENT OFFICE.

J. B. HERMAN, OF MOUNT VERNON, IOWA.

IMPROVEMENT IN CULTIVATORS.

Specification forming part of Letters Patent No. 59,012, dated October 23, 1866.

*To all whom it may concern:*

Be it known that I, J. B. HERMAN, of Mount Vernon, Linn county, State of Iowa, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a plan or top view of the same.

Similar letters of reference indicate like parts.

This invention relates to a new and improved cultivator of that class in which the plows have a vertical and also a lateral adjusting movement.

The invention consists in a novel construction and arrangement of the plows, as hereinafter fully shown and described, whereby the plows are retained in the ground or prevented from rising or being thrown out, and a free lateral movement allowed the two inner plows.

A represents a bar, to each end of which a short bent axle, B, is attached, on which the wheels C are placed and allowed to turn freely.

D is the draft-pole, the rear end of which is framed centrally into the bar A; and E is a cross-bar, which is secured to the draft-pole, and has four pendent bars, F, attached, two near each end, said bars being braced by bars G from the bar A.

H H represent parallel bars which pass through the bar A, and have the driver's seat I secured upon their rear ends, the front ends of the bars H being attached to cross-bars *a* on the brace-bars G.

On the upper surface of the bar A there is attached, by hinges or joints *b*, a bar, J, of flat form, said bar J having a handle, K, attached, which extends back, and is secured, when the plows are elevated, under a hook, *c*, at the side of the driver's seat, as shown in red in Fig. 1.

L L L′ L′ are plow-beams, the front ends of which are secured by joints *d d′* to the lower ends of the outer pendent bars F. The joints *d*, which secure the beams L to the pendent bars F, work only in a vertical direction; but the other joints, *d′*, which secure the beams L to the inner pendent bars F, work both in a vertical and lateral direction.

The plow-beams L′ L′ are straight, and are connected by chains *e* to the outer edge of the hinged bar J, standards M being secured to the rear ends of L′, to which plows N are secured.

To the upper ends of the standards M there are attached stirrups O, to receive the feet of the driver. These stirrups are constructed of metal, made in the form of loops, and of such a shape as not to render the feet uncomfortable in moving the plow-beams L′ laterally, which may be readily done by the driver as the machine is drawn along, so that the plows N may conform to the rows of plants.

The other plow-beams, L, are curved, so that their rear parts will project outward and leave a wide space between for the lateral movement of the plows N. (See Fig. 2.)

To the rear end of each beam L there is attached a standard, M′, having plows P secured to their lower ends. These beams L are connected by chains Q to the bar J, and said chains extend down from the bar J, and are connected to arms R, which are pivoted at their rear ends to the brace-bars G G, said arms being slotted longitudinally, to allow the chains Q to pass through.

When the plow-beams L L′ are lowered to allow the plows to penetrate the earth, the arms R assume a pendent position directly over the beams L, and prevent said beams from rising, the plows P being thereby kept in the ground. When, however, the plow-beams and plows are raised by drawing back the handle K, the arms R are raised by the chains Q, and the beams L are allowed to rise.

Having thus described my invention, what I claim as new, and desire to secure by Letters Patent, is—

1. The arms K, applied to the machine substantially as shown, in combination with the hinged bar J, chains Q, and plow-beams L, all arranged substantially as and for the purpose specified.

2. The curving of the rear parts of the plow-beams L, in combination with the inner laterally-adjustable plow-beams, L, substantially as and for the purpose set forth.

J. B. HERMAN.

Witnesses:
 OLIVER DAY,
 MICHAEL GUTZLER.